July 22, 1958     R. A. WHITBECK     2,843,965
FISHING KITE
Filed June 10, 1955
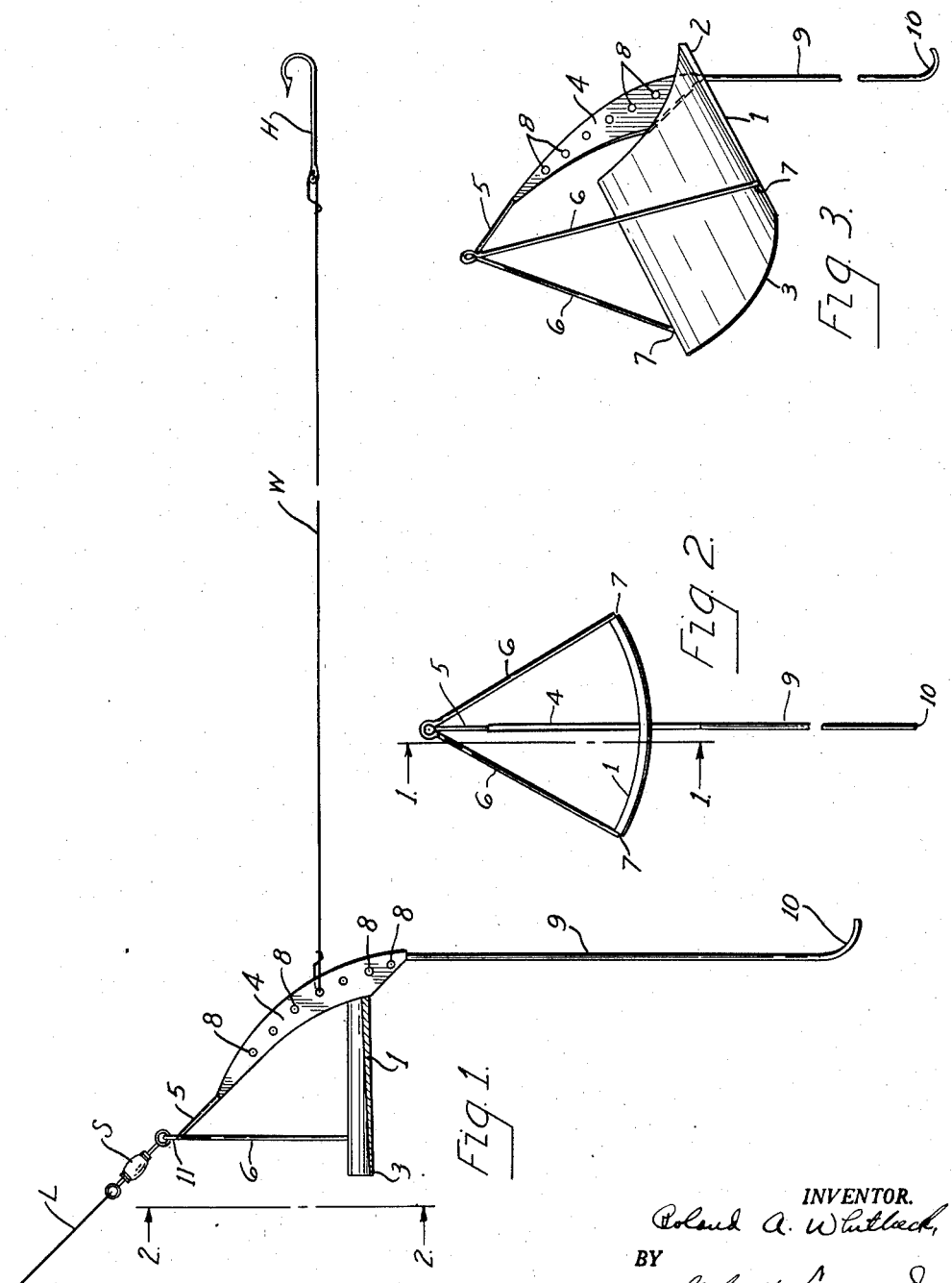

2,843,965
FISHING KITE
Roland A. Whitbeck, Lorain, Ohio

Application June 10, 1955, Serial No. 514,554

7 Claims. (Cl. 43—43.13)

This invention relates to fishing tackle and more particularly to a depth kite for trolling.

The advantages of the present kite reside in its more positive controllability, its stability in the water, the manner in which its depth for any given speed can be varied, and its ability to escape snagging on the rocks and the like, and its effective indication to the fisherman when it is close to bottom.

Other objects and advantages will become apparent from the following description wherein reference is made to the drawings, in which:

Fig. 1 is a side elevation of a kite embodying the principles of the present invention, with the tackle connected thereto, part thereof being shown in section for clearness in illustration;

Fig. 2 is a left end elevation of the kite taken on the line 2—2 in Fig. 1; and

Fig. 3 is a perspective view of the kite.

In the preferred embodiment of the invention illustrated, the kite is one used for trolling, preferably for sea trolling in which it is necessary sometimes for the line to be submerged to very great depths and sometimes to limited depths where there is danger of snagging the kite on the bottom.

Should the vane of a kite of this type strike the bottom while sloping downwardly from its rear to its forward end, it will dig into the bottom quickly and thus is apt to break the line before the trolling speed can be reduced sufficiently to prevent such an accident. It is necessary, therefore, that means be provided on the kite for preventing the blade of the kite from striking the bottom.

The kite of the present invention comprises a vane 1 which preferably is tapered from a substantial thickness at its rear edge, as indicated at 2, to a very narrow sharp leading edge 3. The vane is curved about an axis extending forwardly and rearwardly thereof so as to present, in its normal operating position as illustrated in Fig. 1, a downwardly convex face and an upwardly concave face.

Secured to the vane at its rear or trailing edge is a flat, thin, elongated stabilizing blade 4. The blade 4 is disposed edgewise forwardly and rearwardly of the vane 1 and with its faces at right angles to the surface of the vane 1. One end of the blade 4 is disposed a short distance below the under surface of the vane 1 and the other end is disposed a greater distance thereabove. The blade 4 is curved upwardly forwardly edgewise so that its upper portion is in overhanging relation to the vane 4.

At its upper end, the blade 4 is connected to a rod 5 which in turn is connected to the upper ends of two depending tie rods 6 which extend downwardly to the opposite edges of the vane 1 and are connected to it near its forward edge, as indicated at 7. The blade 4 is provided with a series of holes 8 which are spaced apart along its length, the greater portion of these perforations being above the level of the vane, but some of them being therebelow.

Depending from the lower end of the blade 4 is a depth guard 9 which may extend at right angles to the general plane of the vane 1. The lower end of the guard 9 is curved downwardly and rearwardly, as indicated at 10, so that it can ride readily on the bottom without snagging.

A common eyelet 11 is provided at the common juncture of the rods 5 and 6 and is connected to the swivel S of a fish line L which leads to a fishing pole. A wire leader W is connected at one end to a hook H and the opposite end to one of the holes 8 in the blade 4. Thus for a given continuous forward pull on the line L, the vane 1 will tend to tilt downwardly at its forward end 3 and, due to the reaction of the water against the vane, will move more downwardly in the water. This pull, however, is modified to some extent by the reactionary pull of the water on the rods 6, the line L, the leader W, the baited hook H, and the guard 9.

Assuming that in Fig. 1 the kite has moved downwardly into the water until the downward component of pull of the vane 1, by the vertical component of pull of the line L and the turning moments imposed on the vane 1 by the rods 6, the guard 9, the leader W, and hook H, are in balance, then if the same trolling speed is maintained, the kite will maintain the same depth.

If different depths are desired for the same speed, such can be obtained by shifting the wire leader to different ones of the holes 8. The concavity of the upper face of the vane 1 reduces the tendency for the vane to deflect laterally of its path because the water is constrained thereby to flow more nearly endwise of the vane rather than over the sides of the vane.

The blade 4, being very flat and narrow, and being presented edgewise to the water, also assists in preventing lateral deflection of the vane from its forward path of travel.

The depth guard 9 is designed to strike the bottom if the vane dives too deeply and thus to prevent the vane from digging into the bottom snags front end foremost.

Having thus described my invention, I claim:

1. A water kite comprising a vane having a forward, a rearward, and lateral edges, and smooth upper and lower faces, respectively, a rudder blade attached to, and disposed with its forward edge near the rear of the vane, said blade lying in a plane extending forwardly and rearwardly of the vane and bisecting the vane laterally and disposed at equal angles to the vane at each side respectively of its intersection therewith, and said blade having a forward edge extending upwardly and forwardly from the rear of the vane into overhanging relation to the upper face of the vane, attaching means at the upper end of the blade adapted for connection to a fish line, said blade having a plurality of holes distributed along its length.

2. A device according to claim 1 characterized in that the blade has a lower portion which extends downwardly from the lower face of the blade and said lower portion having at least one hole therein for attachment of a line thereto.

3. A device according to claim 1 characterized in that said vane is of relatively thin metal and, about an axis spaced above the level of its lateral edges and disposed in said plane and parallel to the intersection of said plane and vane, is concave on its upper face and is convex on its lower face.

4. The device according to claim 1 characterized in that an elongated depth guard extends, endwise, downwardly from the vane at the rear of the vane a distance below the vane greater than the distance between the vane and said upper end of the blade.

5. The device according to claim 1 characterized in that tie rod members are secured at their lower ends to the vane at its lateral margins, respectively, near the forward end of the vane and at their upper ends are secured in fixed position relative to said attaching means, and said attaching means are connected to the blade.

6. A device according to claim 1 characterized in that the vane is of metal and is thinner at its forward edge than at its rear edge and progressively increases in thickness from front to rear.

7. A device according to claim 1 characterized in that the rudder blade is in fixed relation to the vane.

References Cited in the file of this patent

UNITED STATES PATENTS

| | | |
|---|---|---|
| 2,545,185 | Winslow | Mar. 13, 1951 |
| 2,731,755 | Ward et al. | Jan. 24, 1956 |